(12) United States Patent
Choi

(10) Patent No.: US 9,098,692 B2
(45) Date of Patent: Aug. 4, 2015

(54) SECURE ELECTROMAGNETIC DATA STORAGE ELEMENT HAVING A SELECTIVELY DETERMIND SWITCHABLE SECURITY MODE

(71) Applicant: Yu Yung Choi, Brooklyn, NY (US)

(72) Inventor: Yu Yung Choi, Brooklyn, NY (US)

( * ) Notice: Subject to any disclaimer, the term of this patent is extended or adjusted under 35 U.S.C. 154(b) by 218 days.

(21) Appl. No.: 13/844,106

(22) Filed: Mar. 15, 2013

(65) Prior Publication Data

US 2013/0241695 A1  Sep. 19, 2013

Related U.S. Application Data

(60) Provisional application No. 61/611,527, filed on Mar. 15, 2012.

(51) Int. Cl.
*G06F 21/35* (2013.01)

(52) U.S. Cl.
CPC ..................... *G06F 21/35* (2013.01)

(58) Field of Classification Search
CPC ....................................................... G06F 21/35
USPC ..................... 340/10.1, 10.5, 572.1
See application file for complete search history.

(56) References Cited

U.S. PATENT DOCUMENTS

| | | | |
|---|---|---|---|
| 7,109,867 B2 | 9/2006 | Forster | |
| 7,375,635 B2 | 5/2008 | Kessler | |
| 7,460,015 B2 | 12/2008 | Forster | |
| 7,737,853 B2 | 6/2010 | Moskowitz | |
| 8,253,568 B2 | 8/2012 | Choi | |
| 2003/0132301 A1* | 7/2003 | Selker | 235/487 |
| 2005/0012616 A1* | 1/2005 | Forster et al. | 340/572.7 |
| 2006/0132313 A1* | 6/2006 | Moskowitz | 340/572.7 |
| 2007/0046469 A1 | 3/2007 | Pempsell | |
| 2007/0200681 A1* | 8/2007 | Colby | 340/10.51 |

* cited by examiner

*Primary Examiner* — Edwin Holloway, III

(57) ABSTRACT

The apparatus of the present invention are directed to a selectively accessible electromagnetically resonant data storage element (implemented as a resonant tag, card, embedded element and/or similar devices), for inventory and facility control and management, for product tracking during transportation, for security purposes (e.g., personal identification (e.g., passports, driver's licenses), access control, etc.), and to facilitate various forms of electronic information interchange (for example in electronic commerce, such as payment card, tag etc.), that is selectively responsive to predetermined electromagnetic interrogation thereof, that comprises a novel connecting component and a security mode selection component, for a user to change from Always-ON to Always-OFF, then enabling selectively to ON and OFF for interrogatory access to resonant component, to protect from unauthorized interrogation thereof.

20 Claims, 6 Drawing Sheets

SECURE ELECTROMAGNETIC DATA STORAGE ELEMENT HAVING A SELECTIVELY DETERMIND SWITCHABLE SECURITY MODE

CROSS REFERENCE TO RELATED APPLICATION

The present application is based on, and claim benefit and priority of, U.S. Provisional Patent Application Ser. No. 61/611,527 filed on Mar. 15, 2012, the contents of which are incorporated herein in their entirety for all purposes.

FIELD OF THE INVENTION

The present invention relates to contactless electromagnetically and/or magnetically resonant tags, cards, inlays, embedded components, and similar devices, that comprise user-controlled means for enabling and disabling the device to protect it from unauthorized interrogation (and related methods) and, more particularly, to a resonant selectively accessible data storage element capable of being utilized in tag, card, embedded or other configurations (e.g., label, sticker, inlay), that is selectively responsive to predetermined electromagnetic interrogation thereof, and that comprises a novel connecting component, for enabling selectively to disable the connecting component to change the resonant data storage element from default Always-ON to thereafter user-controllable resonant data storage element, to selectively switch between security modes to continue utilization for various demand, and to protect it from unauthorized interrogation thereof.

BACKGROUND OF THE INVENTION

In recent years, there has been an accelerated growth in the use of contactless electromagnetic or magnetic resonant data storage ("RDS") devices, or switchable RDS ("SRDS") devices (for example implemented as tags, cards, inlays, embedded elements, and similar devices), for inventory and facility control and management, for product tracking during transportation (e.g., throughout a supply chain), for security purposes (personal identification (e.g., passports, driver's licenses, alien registration cards), access control, etc.), and to facilitate various forms of electronic information interchange (for example in electronic commerce, such as payment cards, etc.). As their cost decreases and their capabilities increase, these RDS devices are also finding their way into many other applications. In addition, RDS devices are combined with electronic article surveillance (EAS) components for use.

However, conventional SRDS devices suffer from a serious disadvantage—default is "Always-OFF"; only the user can switch it ON for use. This kind of default Always-OFF SRDS devices can be a component (e.g., inlay) or finished product (e.g., card). But in many situations, specifically, during the SRDS devices manufacture application, there is a need to communicate with SRDS device for checking or read/write the data etc. on demand. And in another application demand is for supply chain use to trace product, which requests that the SRDS device be Always-ON before point of sale, and so on. Some of the EAS components also have disadvantages—it may have "resurgence" after deactivation. Some products may have two different types of EAS component, but usually one store uses one type of system. Therefore if a store actually has an anti-shoplifting system to deactivate a label they will only deactivate one of the two. Those are often the reason why people trigger an alarm while entering a store, which can cause great frustration for both customers and staff. The problem is most evident in shopping malls where customers float between stores.

In order to address the above problem, applicant in U.S. Pat. Nos. 8,253,568 and 8,253,569 entitled "SECURE ELECTROMAGNETIC DATA STORAGE ELEMENT HAVING A PLURALITY OF SELECTIVELY DETERMINED SWITCHABLE SECURITY MODES", using a security mode control component to keep the SRDS device in default Always-ON. But surely something can be improved.

It would thus be desirable to provide an advantageous SRDS element apparatus that may be implemented as a SRDS tags, labels, cards, tickets, stickers, inlays, embed components, etc. with a connecting component. It would be desirable to provide a SRDS element apparatus that is by default placed in an "Always-ON" security mode in which it is freely accessible until the disabling of the connecting component, to an "Always-OFF" security mode in which the SRDS element is no longer accessible. Thereafter selectively engage the security mode selection component to temporarily set the SRDS element to an "ON" security mode. It would furthermore be desirable to provide a SRDS element security mode selection component with a retention component that is operable by the user to selectively switch the SRDS element from an "Always-OFF" security mode in which the device is not accessible to an "Always-ON" security mode: that is easy and inexpensive to fabricate, that is readily accessible to, and operable by, the user, that is reliable, and that does not damage the SRDS element in which it is implemented after repeated use. Optionally, to provide at least one EAS component with SRDS element, and also include a connecting component, or use different combination of ways to deactivate/destroy the EAS component(s).

SUMMARY OF THE INVENTION

The apparatus and method of the present invention address and resolve all of the disadvantages and laws of the previously known attempted solutions, and provide heretofore unavailable functionality, by advantageously providing a novel connecting component for switchable resonant data storage (SRDS) element that may be implemented as an electromagnetically and/or magnetically resonant tag, card, label, ticket, inlay, and/or embedded element (or equivalent), that is by default "Always-ON", then disable the novel connecting component to change SRDS element to "Always-OFF" for demand, followed after capable of user-selectable operation in one of security modes selection component (button, switch, etc.), wherein in a first security mode, the SRDS element is responsive to predetermined electromagnetic or magnetic interrogation thereof, and wherein in a second security mode, the SRDS element is unresponsive to any interrogation. In accordance with the present invention, the SRDS element apparatus is also operable to be selectively locked in an "Always-ON" security mode in which it is freely accessible until switched (for example, by a user such as removing the retention component), to an "Always-OFF" security mode in which the SRDS element is no longer accessible by interrogation. Obvious it can be Temporary-ON for the remote access.

The SRDS element apparatus and method of the present invention are advantageously provided with an aforementioned releasable retention component for security mode selection component, the retention component is operable to enable a user to selectively switch the SRDS element between "Always-ON" and "Always-OFF" security modes, and in one embodiment thereof, to lock the retention component in one desired (e.g., "retaining" or "released") position on the SRDS element.

In some embodiment thereof, the security mode selection component may also optionally have a releasable retention component (that, by way of example, may be a clip-, swivel-, slide-type or equivalent thereof, or that may be configured as a single use (e.g., "discard after removal"), or a re-insertable pressure retention component), that is selectively operable to maintain the SRDS element in a predetermined desired security mode (i.e., Always-ON or Always-OFF).

In some embodiment thereof, the inventive SRDS element comprises of electronic article surveillance (EAS) component, optionally with an EAS's connecting component, that is selectively operable to disconnect/destroy the EAS component function as needed.

In some embodiment thereof, the inventive SRDS element comprises a top circuitry layer, a bottom circuitry layer, which includes at least one electronic components, such as a microchip (or equivalent circuitry), a plurality of contact pads (include metal dome, poly dome, etc.), at least one antenna, an optional insulation spacer layer, an optional removable (and optionally re-insertable) retention component, at least one optional EAS component, an optional switch component, such as micro-switch, switchable microchip module, button switch, slide switch, membrane switch, bareness switch and touch switch etc.

In at least one embodiment of the present invention, in which the SRDS element is "active", or "powered", the SDRS element also comprises a power supply layer (such as a battery), and/or a component for enabling connection thereof, and optional connect to an external power source. The SRDS element may be set to Passive-Active, Passive-Off-Active, Active-Off-Active and Active-Off-Passive. The SRDS element may comprise display, speaker, interface, fingerprint sensor, printing, fingerprinting, biometric authentication, 3-D picture, security feature, machine readable feature, solar cells, magnetic tape, hologram, KINEGRAM® and signature stripes etc.

The connecting component and selection component of the present invention may be formed, by way of example, through a combination of aligned and configured subcomponents of at least a portion of a SDRS element's layers. In one embodiment thereof, a retention component positioned within the selection component is advantageously utilized to maintain the switch in an ON position and thereby enable the data stored in the SRDS element to be accessible continuously (i.e., keeping the SRDS element in the Always-ON security mode), until such time that the retention component is removed.

In some embodiment of the SRDS element, which may be readily used in conjunction with a product associated therewith, when a consumer purchases a product that has been provided with the SRDS element (which has been associated therewith), the store staff removes (e.g., cut off, peel off, scrape off, punching, laser cut) the connecting component, to change the SRDS element from a previous Always-ON security mode, to an Always-OFF security mode, such that the data stored in the SRDS element is thereafter accessible, through electromagnetic or magnetic interrogation thereof (i.e., placed into an "ON" security mode), but only for as long as the switch is held down by the consumer. SRDS element combined with EAS component also can be removed or deactivated at the same time. After all of security components (SRDS and EAS components) are deactivated, the store staff or consumer still can turn the SRDS "ON" for security usage or other demands.

Therefore, the SRDS element of the present invention provides a greater level of data security than previously known solutions, but is also advantageously balanced with convenience—the inventive SRDS element is freely accessible prior to acquisition of the product associated therewith by a user, and is thereafter easily made secure by the user, who is provided with the capability of readily and selectively enabling access to the data stored therein by operating the SRDS element's security mode selection component. Optionally, the retention component may be re-insertable by the user, such that if the user desires to return the SRDS element to an Always-ON security mode, they may do so by returning the retention component to its previous position within the SRDS element in which it exerts continual hold on the switch.

Also, as is noted above, in alternate embodiments of the inventive SRDS element, rather than relying on utilization of a retention component, one or more appropriate user-operable releasable retention components of a variety of different embodiments and/or configurations, may be advantageously utilized to achieve selective switching between the Always-ON and Always-OFF security modes.

In essence, in various above-described embodiments thereof, structurally the SRDS element of the present invention comprises top and bottom circuitry layer. The circuitry preferably includes an electronic component operable to store and/or to process data (such as an IC microchip, or equivalent), connecting component, contact pads, antenna, optional insulation spacer layer, optional retention component, optional EAS component, display component, switch component and/or switchable microchip module etc. An adhesive, or other technique for keeping the various appropriate portions of the layers affixed to one another, may be readily utilized. In operation thereof, connect component is operable for disabling the change of SRDS element from default Always-ON security mode to a operable stage of Always-OFF security mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF PREFERRED EMBODIMENTS

Figure 1:
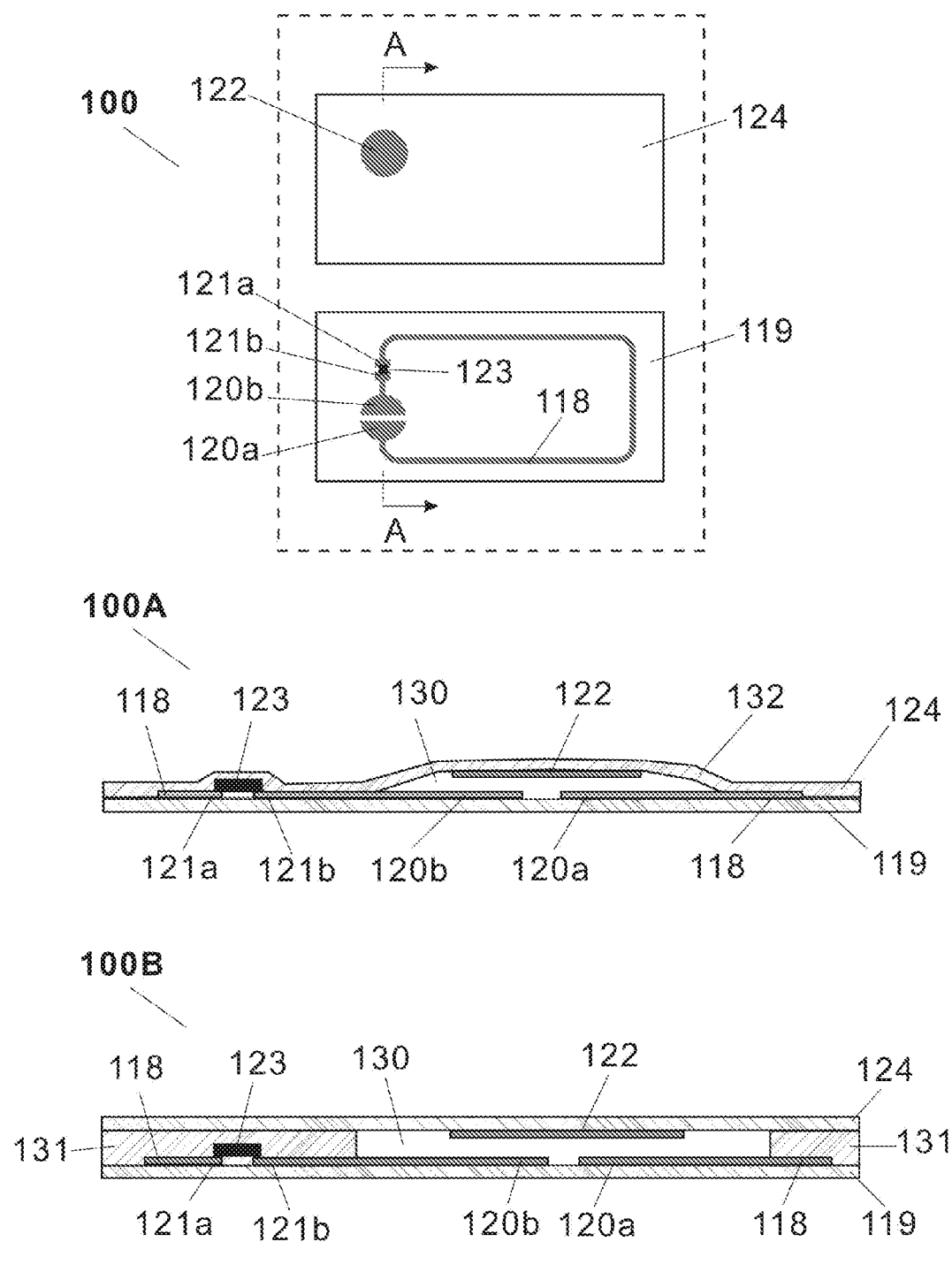
FIG. 1 are prior art, a set plan view of SRDS element 100, a cross-sectional view of two layers of SRDS element 100A and a cross-sectional view of three layers of SRDS element 100B. Both SRDS element 100A and 100B are cross-sectional view taken from line A-A of SRDS element 100.

The apparatus of the present invention are directed to a selectively accessible electromagnetically resonant data storage element (that may be implemented as a resonant tag, card, label, ticket, inlay, and/or embedded element integrated into a product), that is selectively responsive to predetermined electromagnetic interrogation thereof, that comprises a novel connecting component for enabling to disable it, to change switchable resonant data storage (SRDS) element from default Always-ON to Always-OFF, and thereafter enable user to selectively enable and/or disable interrogatory access to the resonant component, to protect from unauthorized interrogation thereof.

In summary, the inventive SRDS element comprises a top circuitry layer, a bottom circuitry layer, which includes a microchip, a plurality of contact pads and an antenna, a connecting component, an optional insulation spacer layer, an optional retention component, an optional display, an optional battery, an optional EAS component and other components etc. The switch may be formed through a combination of aligned and configured subcomponents of at least a portion of the element's layers. In one embodiment thereof, the retention component may be advantageously utilized to maintain the switch in a contacting position to thereby enable the SRDS element to function continuously (i.e., keeping it in an Always-ON security mode), until such time that the retention component is removed.

In this exemplary embodiment of the SRDS element, for example used in conjunction with consumer products, when a consumer purchases a product that has been provided with the SRDS element, he/she removes (e.g., cut off, peel off, scrape off, punching, laser cut) the connecting component or retention component to change the SRDS element from the previous Always-ON security mode to an Always-OFF security mode, such that the SRDS element is only accessible to electromagnetic interrogation thereof, when the switch is connected by the user. Therefore, the SRDS element of the present invention provides a greater level of data security advantageously balanced with convenience—the inventive SRDS element is freely accessible prior to acquisition thereof by a user, and is thereafter easily made secure by the user, who is provided with the capability of readily and selectively enabling access to the data stored therein.

Prior to describing various embodiments of the present invention in greater detail it should be noted that in all embodiments of the present invention, various electronic components capable of storing secure data (and/or of performing other functions) are referred to as "microchip(s)" for the sake of convenience, and by way of example only. It should be understood to one skilled in the art that any electronic component with functionality equivalent to that of an integrated circuit microchip or microchip may be readily utilized in various embodiments of the present invention as a matter of design choice or convenience without departing from the spirit of the invention. Similarly, with respect to references herein to various sub-elements of a microchip (such as pins, contact pads, etc.) are by way of example only—it should be understood by one skilled in the art that if an electronic component other than a microchip is utilized in a SRDS element, the sub-elements with equivalent functionality to contact pads, pins, etc. may be readily utilized without departing from the spirit of the invention.

It should also be noted, that while the inventive SRDS element is shown and described in various embodiments herein as being a multi-layer card or tag etc., the novel SRDS element may also be integrated partially or entirely into a product to provide electromagnetically resonant secure data storage capabilities with user controlled changeable security modes. In embodiments of the present invention with multiple switches, one or more product functions may advantageously be operated from one or more of the switch(es). Which switch(es) may provide other function for the need. In such integrated configurations, the novel SRDS element may not necessarily be formed from the specific aligned layers shown in various figures herein, as long as the switch(es) and at least one releasable retention component is provided therefor.

Additionally, it should be noted that a generally rectangular shape of the various embodiments of the novel SRDS element of the present invention is shown in various figures by way of example only, and is not intended as a limitation on the size and shape thereof. Therefore, the SRDS element may be readily sized and shaped as a matter of design choice without departing from the spirit of the invention. For example, the SRDS element may be square, circular, oval, or any other geometric shape, and/or it may range in size from a small postage stamp to a large document.

Referring now to FIG. 1 are prior art, a set plan view of SRDS element 100, a cross-sectional view of two layers of SRDS element 100A and a cross-sectional view of three layers of SRDS element 100B. Both SRDS element 100A and 100B are cross-sectional view taken from line A-A of SRDS element 100.

The SRDS element 100 comprises a top layer 124 and a bottom layer 119. A bridge contact pad 122 is positioned in a switching area of the top layer 124, while a microchip 123 bonded between contactors 121a and 121b is positioned on the bottom layer. The contactor 121a is connected to an antenna 118, while the other contactor 121b is connected to the switching contact pad 120b and the next to contact pad 120b is another contact pad 120a connecting to the antenna 118.

In 100A, a cross-sectional view of a SRDS element, illustrates a SRDS element configuration in which only two layers are used. A top layer 124 comprises a dome-like portion 132 which includes a bridge contact pad 122 therein. A bottom layer 119 includes contact pads 120a and 120b. The microchip 123 and a set of its two corresponding contactors 121a, 121b, as well as an antenna 118 are positioned between the top layer 124 and the bottom layer 119, with an additional empty region 130 defined in the switching area between the bridge contact pad 122 and the contact pads 120a, 120b.

In 100B, a cross-sectional view of a SRDS element, illustrates a SRDS element configuration in which three layers are used. Its difference from 100A is the use of a space layer 131 between the top layer 124 and the bottom layer 119. It does not use the dome-like button.

All of switches are membrane switches, only when pressure is applied to the switch area. The bridge contact pad 122 is connected to contact pads 120a and 120b to make an electrical connection, to enable the SRDS element. In this kind of SRDS element by default is Always-OFF.

Figure 2:
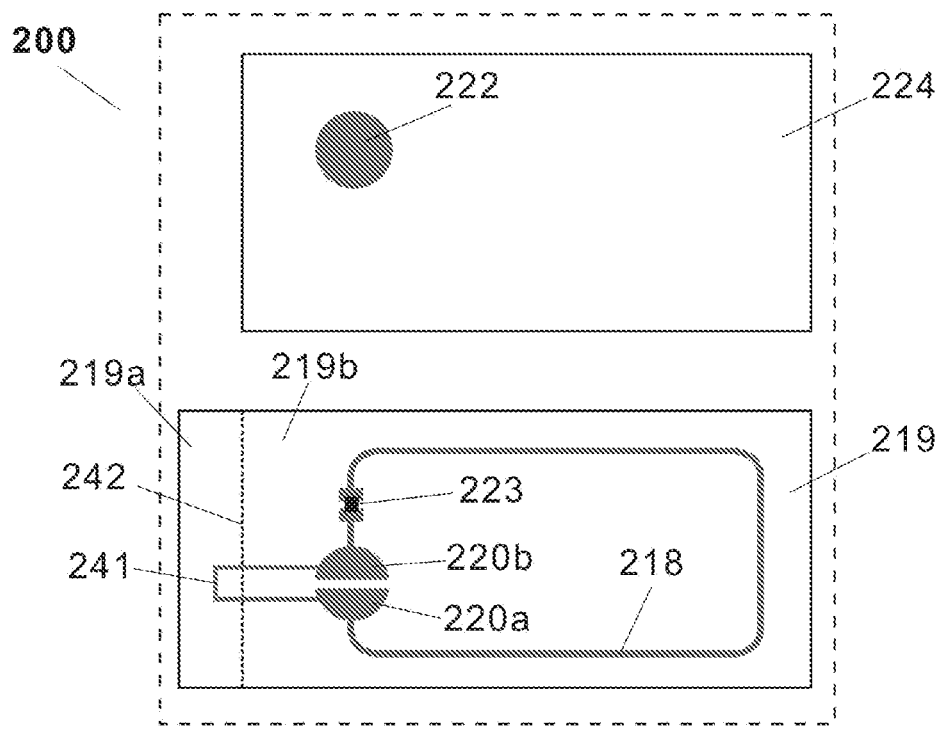
FIG. 2 is a plan view of a first exemplary embodiment of a set of SRDS element, illustrating a connecting component connected between both contact pads.

FIG. 2 is a plan view of a first exemplary embodiment of a set of SRDS element 200, illustrating a connecting component 241 connected between both contact pads 220a and 220b. The SRDS element 200 comprises a top layer 224 and a bottom layer 219. A bridge contact pad 222 is positioned in a switching area of the top layer 224, while a microchip 223 bonded on the circuit is positioned on the bottom layer 219, and connected to an antenna 218, while it is connected to the switching contact pad 220b and next to contact pad 220b is another contact pad 220a connecting to the antenna 218, a cutting line 242 partitions bottom layer 219 into two segments 219a and 219b. A connecting component 241 is connected contact pads 220a and 220b to make a complete circuit, while a part of the connecting component 241 crosses the cutting line 242, which can cutoff the connection component 241.

In the embodiment bottom layer 219 has a complete circuit; it is Always-ON. For example, in the inlays or cards, manufacturing need SRDS element 200 to be Always-ON, to check or read/write the data to the microchip 223, then cutoff the segment 219a from the cutting line 242 to disconnect the connecting component 241 when product is finished, thereafter if there is a need to enable SRDS element 200, it can be accomplish by using contact bridge 222 to connect the contact pads 220a and 220b.

The SRDS element 200 or the bottom layer 219 can be an inlay, a flexible printed circuit boards (Flex PCB or FPC) etc., all of circuits (e.g., antenna, contact pad and connecting component) can be formed by conductive material (e.g., aluminum, copper, silver, silver ink) utilizing printed, etched, film deposition, etc., even the microchip 223 may be formed by printable electronics. The contact pads 220a and 220b can be any geometric figures and sizes. The antenna can be a low frequency (LF) antenna, a high frequency (HF) antenna, an ultra high frequency (UHF) antenna, a WIFI antenna, a Bluetooth antenna, a RFID antenna, a NFC antenna, a microwave antenna, a cellular antenna, a satellite antenna, a RuBee magnetic antenna, etc. The SRDS element may comprise of more than one of SRDS elements (not shown). And this embodiment shows the top and bottom two layers for example only, there may be as many layers as you need used.

The SRDS element 200 may utilize, but not limited to, paper, plastic (e.g., PET, PVC, BOPP, PE, PS, Polyamide, Vinyl), cloth, leather, wood, synthetic fabric or any combination of said materials formed to the shape of rectangular, square, circular, oval, or any other geometric shape. The SRDS element 200 may use a graphic printed (e.g., letter, barcode, picture) card, tag, hang tag, ticket, label, sticker, integrated tag, etc. The connecting component can be disabled by manufacturer, store, consumer, end-user, owner, authorized party, etc.

Figure 3:
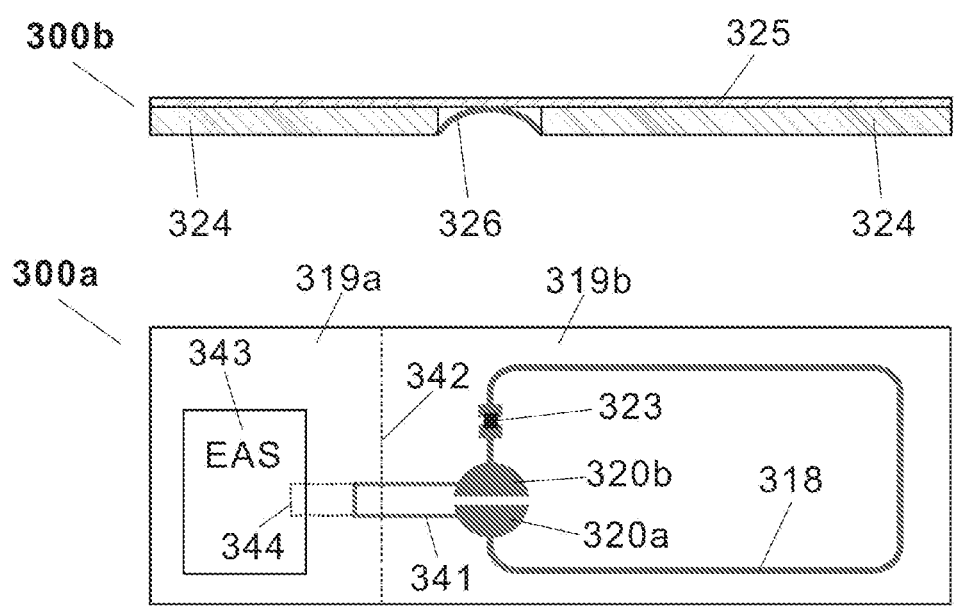
FIG. 3 is a plan view of bottom layer and cross-sectional view top layer of alternate embodiment, illustrating further including electronic article surveillance (EAS)

FIG. 3 is a plan view of bottom layer 300a and cross-sectional view top layer 300b of alternate embodiment, illustrating further including electronic article surveillance (EAS) 343. The SRDS element bottom layer 300a comprises microchip 323 bonded on the circuit which is positioned on the bottom layer 319, and connected to an antenna 318, which is connected to the switching contact pad 320b and next to contact pad 320b is another contact pad 320a connecting to the antenna 318, a cutting line 342 partitions bottom layer into two segments 319a and 319b, a connecting component 341 is connected contact pads 320a and 320b to make a complete circuit, while a part of the connecting component 341 is across the cutting line 342, which can cutoff the connection component 341. In the segment 319a includes an EAS 343. In other embodiment the connecting component 344 may extent to the EAS 343 or as a part of EAS 343. Such as the connect component 344 is a part of EAS's antenna, etc.

In the embodiment SRDS element has a complete circuit, thus it is Always-ON. It can be a product tag, which may be formed by paper, plastic (e.g., PET, PVC and PE), fiber, chemical fiber etc., it is tagging or embedding with product. For example the SRDS element is Always-ON for the products used in supply chain and inventory purposes, but when a consumer purchases the product, segment 319a of SRDS element is cutoff to disable SRDS element and to change it to Always-OFF mode. In addition, one can also disable the EAS 343 by cutting off the entire EAS 343 or part of EAS (e.g., antenna, (not shown)). The EAS can be located in either or between segments 319a and 319b, and in the same layer or different layer of SRDS element. The EAS 343 may respond to one of several systems: magnetic systems, acousto-magnetic systems, radio-frequency systems and microwave systems. It may be deactivated by its corresponding systems.

On the top layer 300b comprises a dome-like contact pad 326 in the optional layer 324. The contact pad may be under surface layer 325, in the flat or bulge of the surface. The dome-like (shape) may be formed by optional layer 324, or a single component (e.g., metal dome, poly dome) to make a tick.

Figure 4:
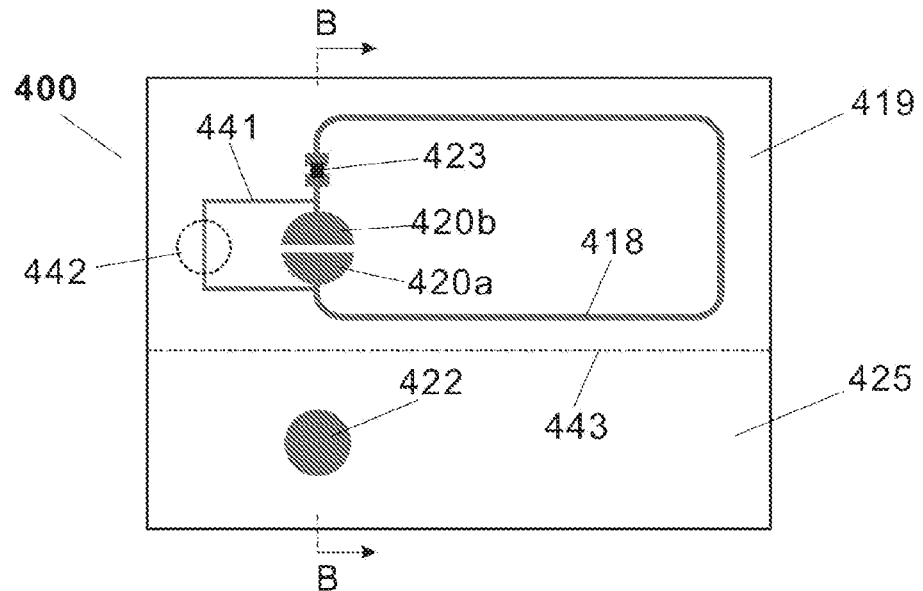
FIG. 4 is a plan view of a second exemplary embodiment of a SRDS element, illustrating a punch hole and a folding line.

FIG. 4 is a plan view of a second exemplary embodiment of a SRDS element 400, illustrating a punch-hole line 442 and a folding line 443. The SRDS element 400 comprises a circuit layer 419 and a button layer 425. A bridge contact pad 422 is positioned in a switching area of the button layer 425, while a microchip 423 is bonded on the circuit and positioned on the circuit layer 419, and connected to an antenna 418 and the switching contact pad 420b and the next to contact pad 420b is another contact pad 420a connecting to the antenna 418, the connecting component 441 is connected the circuits between the contact pads 420a and 420b to make a complete circuit. A hole punch punches from the punch-hole line 442, then cuts off the connecting component 441 to disable the SRDS element 400. A folding line 443 is located between circuit layer 419 and button layer 425. the button layer 425 can fold over to the circuit layer 419, to make bridge contact pad 422 electronically connect with the contact pads 420a and 420b, to enable the SRDS element 400, because the contact pads 420a, 420b and bridge contact pad are not covered; they are bare (shown in the FIG. 5 of contact pads 520a, 520b and bridge contact pad 522).

The circuit layer 419 and button layer 425 can be the same layer or different layer. They may not be connected to each other. The punch-hole line 442 can be any shape and size. The connecting component 441 may be a conductive sticker (not shown) stuck on the contact pads 420a and 420b, to cause electronic connection. When the conductive sticker is peeled off, the SRDS element 400 will be disabled.

Figure 5:
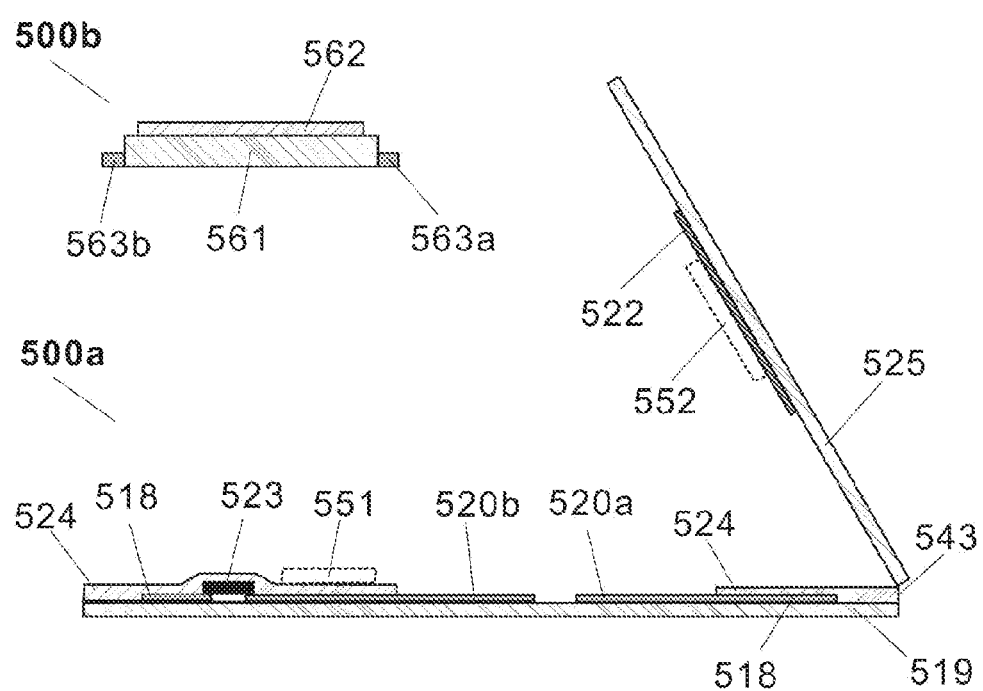
FIG. 5 is a cross-sectional view of SRDS element 500a taken from line B-B of FIG. 4 and a cross-sectional view of module component 500b, illustrating a bareness switch and the optionally retention components.

FIG. 5 is a cross-sectional view of SRDS element 500a taken from line B-B of FIG. 4 and a cross-sectional view of module component 500b, illustrating a bareness switch and the optional retention components. The SRDS element 500a comprises of a microchip 523 connected to antenna 518 and contact pad 520b and anther contact pad 520 connected to the antenna 518; all circuits are sandwiched between layer 519 and layer 524, without the switching area contact pads 520a and 520b are bare. A folding layer 525 is folded from the folding line 543 closed to layer 524, the bridge contact pad 522 on the folding layer 525 also bare, it will electronically connect the contact pads 520a and 520b, to enable the SRDS element 500a. Some embodiment may have retention component 551 and/or 552 for holding the bridge contact pad 522 for continuous engagement, to make the SRDS element in Always-ON mode. The retention component may be included, but is not limited to, re-stick glue (or adhesive), conductive glue, hook-and-loop fastener, snap button and equivalent retention component. The folding layer 525 may be not connected to the layer 524 and 519, as it is a separate component.

In other embodiment a module component 500b may have a complete micro-switch or a switchable microchip module (inside containing a microchip) 561, comprises a button 562 for enable the SRDS element, and at least two contact pins 563a and 563b for binding on the contact pads 520a and 520b of SRDS element 500a. The module component 500b may be in the SRDS element 300a of FIG. 3, it binds the contact pads 320a and 320b and is covered under surface layer 325 of top layer 300b.

The SRDS element may be an EMV dual interface card, which has a contact interface that includes eight contact pads. An embodiment may use two of those contact pads (e.g., C4 and C8 are remaining for other uses now) for bare switch use. The bare switch may use just one finger to connect two contact pads, to make an electronic connection, to enable the SRDS element.

Figure 6:
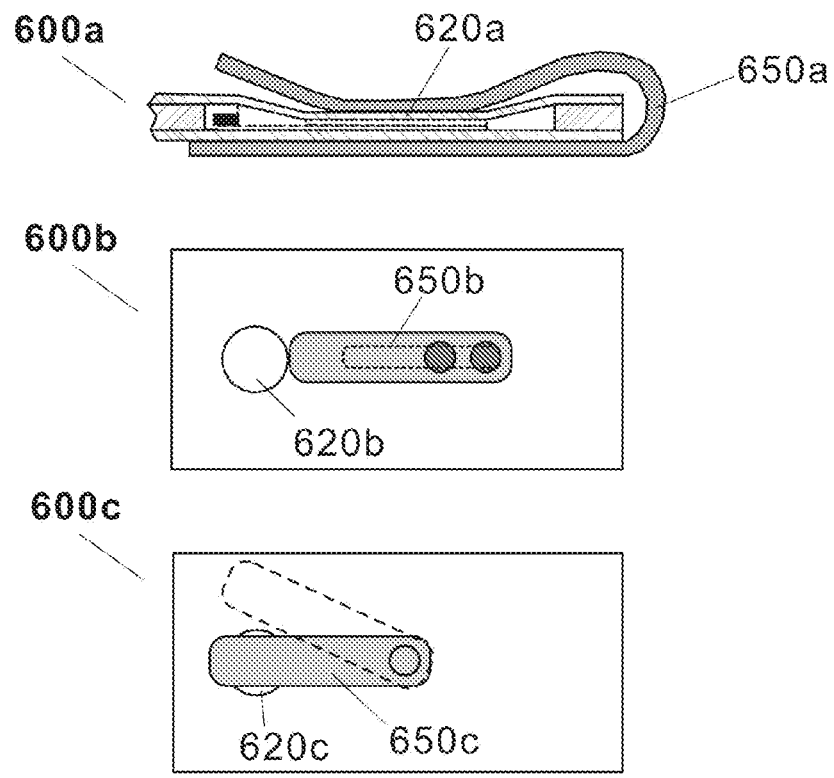
FIG. 6 is a cross-sectional view and two plan views of different kinds of retention component in SRDS elements.

FIG. 6 is a cross-sectional view 600a and two plan views 600b and 600c of different kinds of retention component in SRDS elements. The SRDS elements' switches 620a, 620b and 620c are press active switches or bare switches. The retention components 650a, 650b and 650c may be formed by conductive material or form the conducting material on the point of switch contacts. The SRDS element 600a comprises of a clip-type component 650a; it can be removed and re-inserted, to disable or enable and maintain a pressure and contact for switch 620a, to continuously enable the SRDS element 600a. The SRDS element 600b comprises a slide-type component 650b, like a moving dolly, to disable or enable and maintain a pressure and contact for switch 620b, to continuously enable the SRDS element 600b. The SRDS element 600c comprises a swing-type component 650c, such as Around Mobile, to disable or enable and maintain a pressure and contact for switch 620c, to continuously enable the SRDS element 600c.

Figure 7:
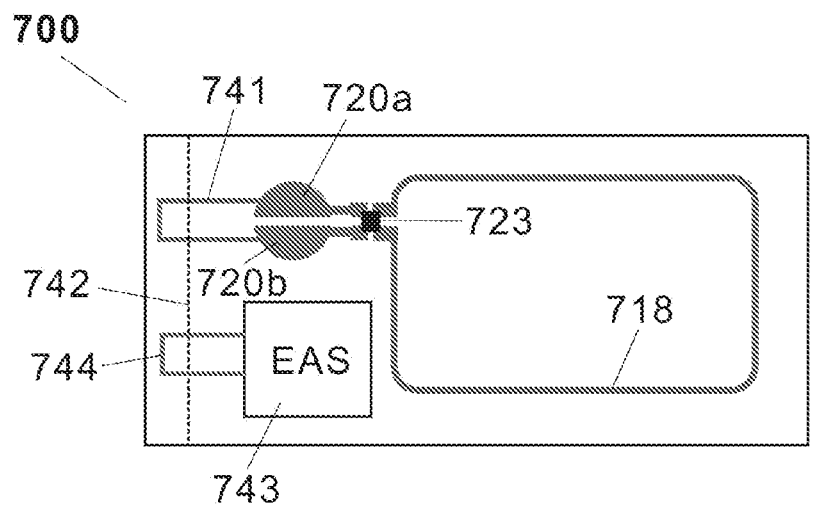
FIG. 7 is a plan view of a third exemplary embodiment of a SRDS element, illustrating a microchip with four contact pins and an EAS with a connecting component.

FIG. 7 is a plan view of a third exemplary embodiment of a SRDS element 700, illustrating a microchip 723 with four contact pins and an EAS 743 with a connecting component 744. The SRDS element 700 comprises of a microchip 723 with four contact pins (not shown), two contact pins for control activation SRDS element, connected to contact pads 720a and 720b, another two contact pins connected to antenna 718, a connecting component 741 connected to contact pad 720a across the cutting line 742, then retrace to connect the contact pad 720b, to set SRDS element by default to Always-ON. An EAS component 743 also comprises itself connecting component 744 across the cutting line 742. Therefore, when the cutting line 742 is cutoff, it will disable the SRDS element 700 and EAS component 743 at the same time. The EAS component 743, connecting component 741, 744 and contact pads 720a, 720b and antenna 718 etc. are formed by conductive materials (e.g., aluminum, copper, silver, silver ink) utilizing printed, etched, film deposition, etc., on the same layer or different layer, even the microchip 723 may be formed by printable electronics. The SRDS element 700 is in passive operation. The microchip may connect with more than one antenna (e.g., LF antenna, HF antenna, UHF antenna) and security mode selection component (not show).

Figure 8:
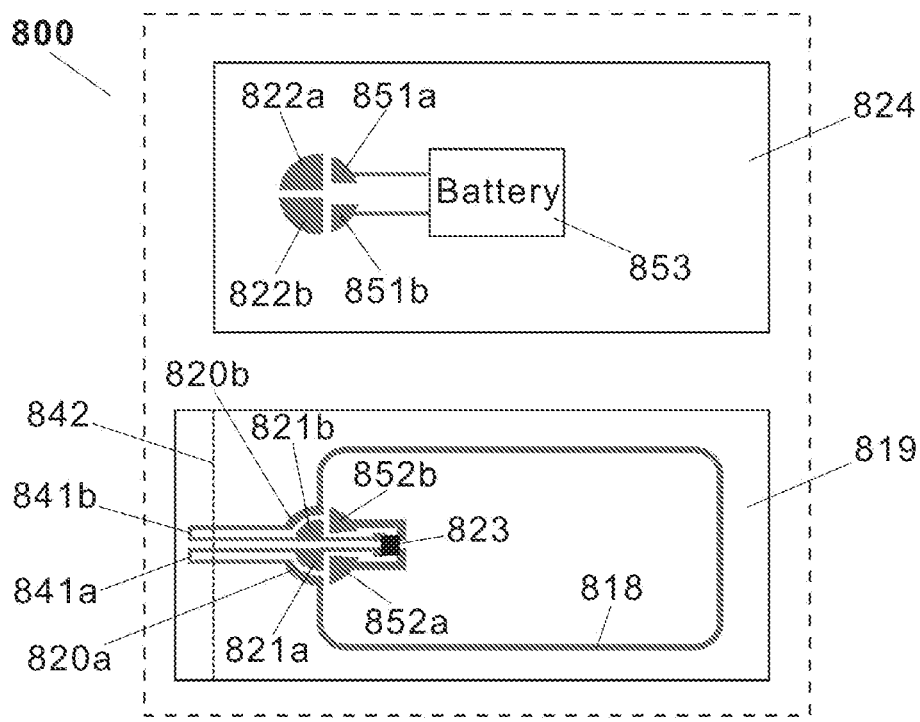
FIG. 8 is a plan view of a fourth exemplary embodiment of a SRDS element, illustrating a plural-break switch and a battery component.

FIG. 8 is a plan view of a fourth exemplary embodiment of a SRDS element 800, illustrating a plural-break switch and a battery component 852. The SRDS element 800 of bottom layer 819 comprises of a microchip 823 with at least four contact pins (not shown), with two contact pins connected to antenna 818 contact pads 821a and 821b, and another two contact pins connected to battery contact pads 852a and 852b. The connecting component 841a is retrace over the cutting line 842 connected between antenna 818 contact pads 820a and 821a Also the other connecting component 841b is retraced over the cutting line 842 connected between antenna 818 contact pads 820b and 821b. In this structure when cutting line 842 is cut, it will disconnect two connecting components 841a and 841b, therefore the microchip 823 will be completely disconnected from antenna 818, unlike previous embodiments which only disconnected one side of antenna's connection. The top layer 824 comprises a battery component 853 connected to two battery contact pads 851a and 851b for connecting battery contact pads 852a and 852b to provide power for microchip 823, two bridge contact pads 822a and 822b for electronically connected contact pad 820a with 821a and 820b with 821b. All the contact pads are located in the switching area. Once the switch is engaged, each contact pads will connect to each other by corresponding predetermined functions. In the switching area there are ten contact pads and four electronic connections, which are plural-break switches.

In embodiment the SRDS element 800 by default is in passive Always-ON mode, when disconnected the connecting components 841a and 841b will change to Always-OFF mode. Once the switch is engaged, it becomes an active SRDS element 800. Another embodiment does not disconnect the connecting component 841a and 841b. Just by engaging the switch it will change from passive change to active SRDS element 800. Therefore, the SRDS element 800 can alternate between Passive-Off-Active and Passive-Active-Passive in use. The SRDS element 800 may be comprised of other components, such as display, flash, vocal, visual, fingerprint, machine-readable, interface, etc.

Figure 9:
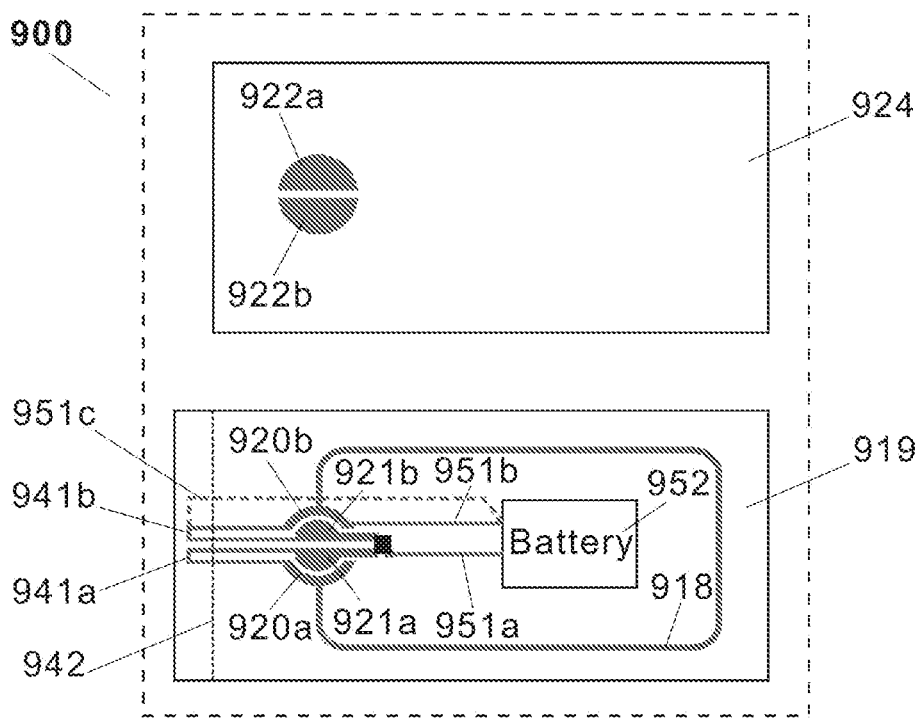
FIG. 9 is a plan view of a fifth exemplary embodiment of a SRDS element, illustrating a double-break switch and a battery component.

FIG. 9 is a plan view of a fifth exemplary embodiment of a SRDS element, illustrating a double-break switch and a battery component. The SRDS element 900 of bottom layer 919 comprises of a microchip with at least three contact pins (not shown), one of the contact pads passes circuit link 951a connected to the battery 952, two contact pads are connected to antenna contact pads 921a and 921b. The antenna 918 also has two contact pads 920a and 920b. The battery has another circuit link 951b and is connected to the antenna contact pad 921b. The connecting component 941a is retraced over the cutting line 942 connected between antenna 918 contact pads 920a and 921a. Also the other connecting component 941b is retraced over the cutting line 942 connected between antenna 918 contact pads 920b and 921b. In this structure when the cutting line 942 is cut, it will disconnected two connecting components 941a and 941b; therefore the microchip will be completely disconnected from antenna 918. The top layer 924 comprises of two bridge contact pads 922a and 922b which will electronically connect antenna contact pads 920a with 921a and contact pads 920b with 921b when SRDS element is engaged. In this configuration the SRDS element in default is in active Always-ON mode, when disconnected from the connecting components 941a and 941b will disable the SRDS element, which is in Always-OFF mode, and thereafter engage the switch to enable active SRDS element, therefore it is Active-Off-Active for usage. In another embodiment the battery circuit link 951b is replaced to circuit link 951c, which is connected to one side of connecting component 941b, located in the other side and across the cutting line 942, which when cutoff will disconnect the battery 952 with microchip connection. Even when the switch is engaged the microchip is still without battery 952 power supply. It is working passively; therefore it is Active-Off-Passive for usage.

Figure 10:
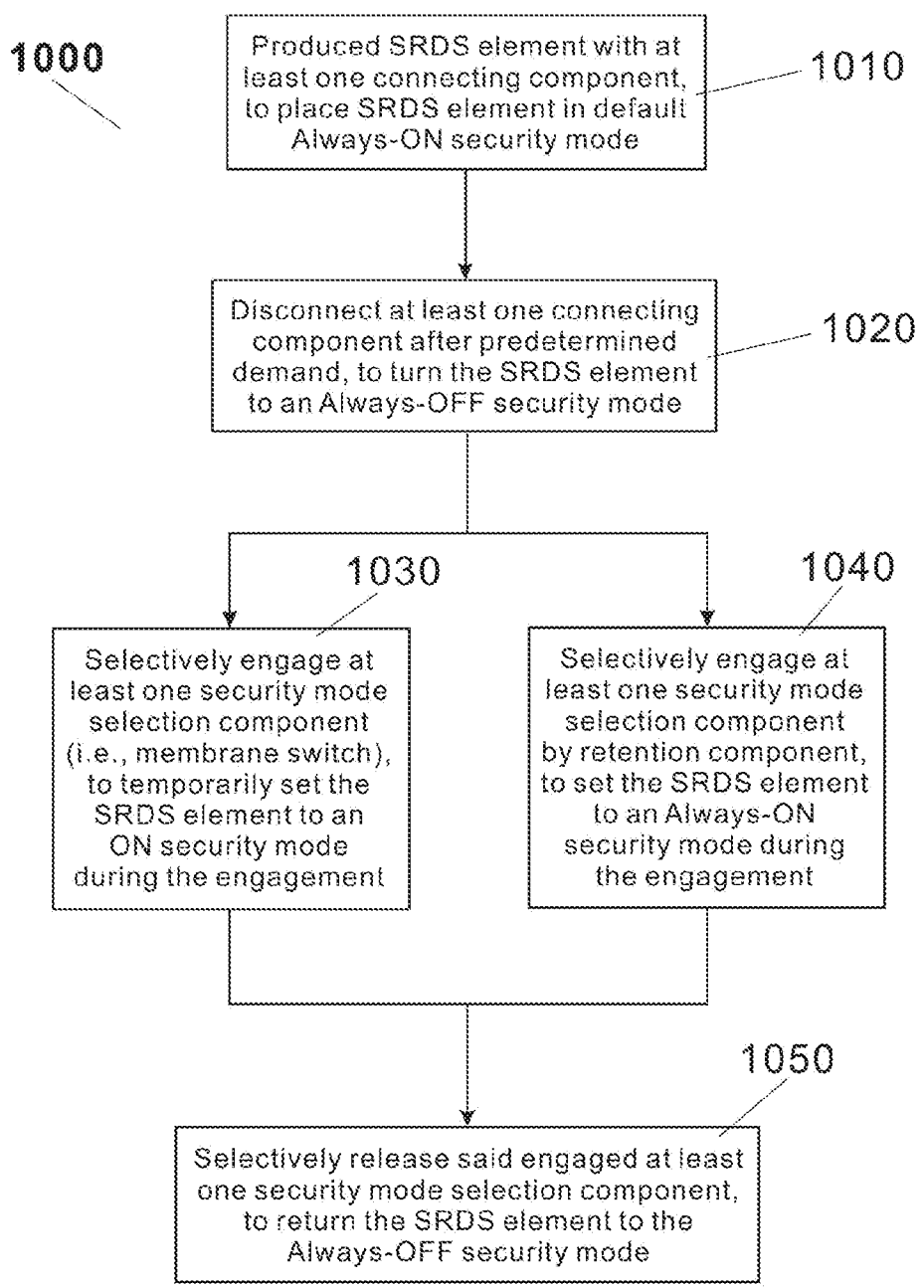
FIG. 10 is a process flow diagram that shows an exemplary embodiment of a process of utilizing an inventive process of applying, and thereafter disabling connecting component, and continue enable user selectively use selection component to ON and OFF SRDS element.

FIG. 10 is a process flow diagram that shows an exemplary embodiment of a process 1000 of utilizing an inventive process of applying, and thereafter disabling connecting component, and continuing to enable user to selectively use selection component to turn ON and OFF SRDS element. At the first step 1010, an inventive SRDS element is produced. The process of SRDS element production may be implemented utilizing any of a variety of solutions and/or techniques, including, but not limited to:

1) manufacturing at least two layers for a SRDS element,
2) providing at least one connecting component for the SRDS element,
3) providing at least one EAS for the SRDS element,
4) providing at least one retention component for selectively maintaining the MSRDS element in a default Always-ON security mode, etc.,
5) providing a power source for the SRDS element.

In essence, the various embodiments of the inventive SRDS element may be readily fabricated utilizing any of a variety of thin device membrane switch fabrication techniques and solutions, such as stamping, printing, layering films, or a combination thereof, etc. The inventive SRDS element is initially fabricated in an Always-ON default security mode setting and supplied to initial customers in such a state.

For example, the product manufacturers wishing to use the inventive SRDS elements with their products, at least one connecting component of each SRDS element is connected between the contact pads to make a complete circuit, therefore at least one microchip (or an equivalent electronic component operable to store data therein) to at least one corresponding SRDS element antenna to allow wireless access (read, write, etc.) to data stored therein and/or to stored SRDS element settings, and to therefore set the MSRDS element to a default corresponding Always-ON security mode. In this mode, novel SRDS elements can desirably behave as conventional industrial logistics EM resonant tags that can be readily read, tracked, and inventoried as products to which they are assigned move through commerce (e.g., from manufacturers, to distributors, to retailers, for example, throughout a supply chain).

At step 1020, which may be selectively performed, at some time period after step 1010, by a consumer purchasing, from a retailer, a product supplied with a novel SRDS element in an Always-ON security mode, at least one connecting component of the product's SRDS element is disconnected to turn the SRDS element to an Always-OFF security mode by store staff or customer. For another application during the card product manufacturing, after data read/write or quality check may disconnect the connecting element, to set SRDS element to an Always-OFF security mode.

At step 1030, which may be selectively performed, at some time period after step 1020, by the consumer who purchased the product supplied with the SRDS element or as a payment card product supplied with the SRDS element, set to the Always-OFF security mode at step 1020, when access to the SRDS element microchip becomes necessary, the user first selectively engages at least one SRDS element security mode selection component (e.g., at least one membrane switch) to temporarily set the SRDS element into an ON security mode which is maintained as long as the consumer continues to engage the security mode selection component (i.e., as long as the membrane switch is kept in a pressed position) for as long as is necessary to access the SRDS element microchip and perform the desired task(s). When access to the SRDS element microchip is no longer necessary, at step 1050, the consumer releases at least one security mode selection component (e.g., by ceasing pressure on the membrane switch), to thereby return the SRDS element to its "Always-OFF" security mode.

At step 1040, which may be selectively performed, at some time period after step 1020, similar to step 1030 user can selectively engage at least one SRDS element security mode selection component, alternating by using a retention component to maintain selection component in continuous engagement, to keep SRDS element in an Always-ON security mode. Otherwise, selectively remove retention component, to release the engaged from at least one security mode selection component at step 1050, to thereby return the SRDS element to its "Always-OFF" security mode.

Thus, while there have been shown and described and pointed out fundamental novel features of the inventive system and method as applied to exemplary embodiments thereof, it will be understood that various omissions and substitutions and changes in the form and details of the products and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A resonant data storage device for securely storing data that is only accessible by at least one compatible resonant data access apparatus when the resonant data storage device is in an ON mode, and for otherwise preventing access to the stored data, comprising:
   an electronic component operable to store the data;
   at least one antenna, operable to enable wireless access to said electronic component only when said antenna is electrically connected thereto;
   at least one operable connection component provides a complete circuit to place said device in an always ON mode;
   at least one security mode selection component operable in an ON/OFF mode;
   wherein, said connection component to make a complete circuit causes said selection component to disable the ON/OFF function, when said connection component is disabled or disconnected then said selection component is able to operate the ON/OFF function.

2. The resonant data storage device of claim 1, wherein said at least one antenna is selected from a group comprising at least one of: low frequency (LF), high frequency (HF) antenna, ultra-high frequency (UHF) antenna, RFID antenna, WIFI antenna, microwave antenna, cellular antenna, satellite antenna, Near Field Communication (NFC) antenna, Bluetooth antenna, magnetic antenna, and/or RuBee antenna.

3. The resonant data storage device of claim 1, wherein said at least one connection component is disabled or disconnected by at least one of: manufacturer, store, consumer, end-user, owner, authorized party.

4. The resonant data storage device of claim 1, wherein said at least one security mode selection component comprises a membrane switch.

5. The resonant data storage device of claim 1, wherein said at least one security mode selection component comprise at least one of: micro-switch, switchable microchip module, button switch, slide switch, membrane switch, plural-break switch, fingerprint switch, remote-control switch, wireless-control switch, sensor switch, bareness switch and/or touch switch.

6. The resonant data storage device of claim 1, further comprise at least one of: battery, display, speaker, interface, flash, lens, barcode, QR code, fingerprint sensor, printing, fingerprinting, biometric authentication, 3-D picture, security feature, machine readable feature, solar cells, magnetic tape, hologram, KINEGRAM and/or signature stripes.

7. The resonant data storage device of claim 1, wherein said at least one connection component is disconnect by at least one of: cut off, peel off, scrape off, punching and laser cut.

8. The resonant data storage device of claim 1, further comprise at least one electronic article surveillance (EAS).

9. The resonant data storage device of claim 8, wherein said at least one EAS comprise connection component use for disable said EAS of function.

10. The resonant data storage device of claim 1, further comprise a retention component use for keeping the device in Always-ON mode.

11. The resonant data storage device of claim 1, wherein said resonant data storage device is at least one of: ID cards, payment cards, access cards, multifunction cards, remote cards, media cards, tickets, labels, tags, inlays, apparel, mobile devices, wearable devices, smart devices, and/or embedded elements.

12. The resonant data storage device of claim 1, wherein said at least one connection component and said at least one security mode selection component, in use to form a different combination of: Passive-Active-Passive, Passive-Off-Active, Active-Off-Active and Active-Off-Passive.

13. The resonant data storage device of claim 1, wherein said at least one security mode selection component further comprise at least one function other than ON/OFF the remote access.

14. A resonant data storage device for securely storing data that is only accessible by at least one compatible resonant data access apparatus when the resonant data storage device is in an ON mode, and for otherwise preventing access to the stored data, comprising:
  an electronic component operable to store the data;
  at least one antenna, operable to enable remote access to said electronic component only when said at least one antenna is electrically connected thereto;
  at least one operable connection component provides a complete circuit to place the device in an always ON mode;
  at least one switch, operable to selectively switch between ON/OFF mode function is when said connection component is disabled or disconnected.

15. The resonant data storage device of claim 14, wherein said at least one switch comprise at least one of: micro-switch, switchable microchip module, button switch, slide switch, membrane switch, plural-break switch, fingerprint switch, remote-control switch, wireless-control switch, sensor switch, bareness switch and/or touch switch.

16. The resonant data storage device of claim 14, wherein said resonant data storage device is at least one of: ID cards, payment cards, access cards, multifunction cards, remote cards, media cards, tickets, labels, tags, inlays, apparels, mobile devices, wearable devices, smart devices, and/or embedded elements.

17. A method for using and/or processing SRDS element by the steps of:
  1). Produced SRDS element with at least one connecting component to make a complete circuit, to disable at least one security mode selection component's ON/OFF function and place SRDS element in default Always-ON security mode;
  2). Disconnect or disable at least one connecting component after predetermined demand, to enable security mode selection component's ON/OFF function;
  3). Selectively engage or control at least one security mode selection component, to set the SRDS element to an ON or Always-ON security mode; or
    Selectively engage or control at least one security mode selection component by retention component, to set the SRDS element to an Always-ON security mode.

18. The resonant data storage device of claim 14, wherein said at least one antenna is selected from a group comprising at least one of: low frequency (LF), high frequency (HF) antenna, ultra-high frequency (UHF) antenna, RFID antenna, WIFI antenna, microwave antenna, cellular antenna, satellite antenna, Near Field Communication (NFC) antenna, Bluetooth antenna, magnetic antenna, and/or RuBee antenna.

19. The resonant data storage device of claim 14, further comprise at least one of: battery, display, speaker, flash, lens, interface, barcode, QR code, fingerprint sensor, printing, fingerprinting, biometric authentication, 3-D picture, security feature, electronic article surveillance (EAS), machine readable feature, solar cells, magnetic tape, hologram, KINEGRAM and/or signature stripes.

20. The resonant data storage device of claim 14, wherein said at least one security mode selection component further comprise at least one function other than ON/OFF the remote access.

* * * * *